United States Patent [19]

Du Quesne

[11] 4,072,178

[45] Feb. 7, 1978

[54] DEVICE USED FOR DETACHING THE BEADS OF A TIRE FROM THE WHEEL RIM

[76] Inventor: Francis Du Quesne, Gemzenstraat 13, 2610 Wilrijk, Belgium

[21] Appl. No.: 755,418

[22] Filed: Dec. 29, 1976

[30] Foreign Application Priority Data

Jan. 16, 1976 Belgium .................................. 254758

[51] Int. Cl.² ............................................ B60C 25/08
[52] U.S. Cl. ................................................. 157/1.17
[58] Field of Search ....................... 157/1.17, 1.24, 1.26

[56] References Cited

U.S. PATENT DOCUMENTS

| | | | |
|---|---|---|---|
| 3,362,453 | 1/1968 | Nester | 157/1.17 |
| 3,426,827 | 2/1969 | Whited et al. | 157/1.26 |
| 3,489,198 | 1/1970 | Malinski | 157/1.24 X |

Primary Examiner—James L. Jones, Jr.
Assistant Examiner—James G. Smith
Attorney, Agent, or Firm—William Anthony Drucker

[57] ABSTRACT

The present device is for detaching the beads of a tire which adhere to a wheel rim more particularly of heavy vehicles, whereby the wheel is held between a mobile stabilizer shield of an upright fixed frame and an upright mobile backing support and whereby a pressure plate is provided of an in the fixed frame in a vertical plane pivotally suspended pressure cylinder adjustable in height. After the beads are detached, the tire is removed from the wheel by the use of another known device.

7 Claims, 3 Drawing Figures

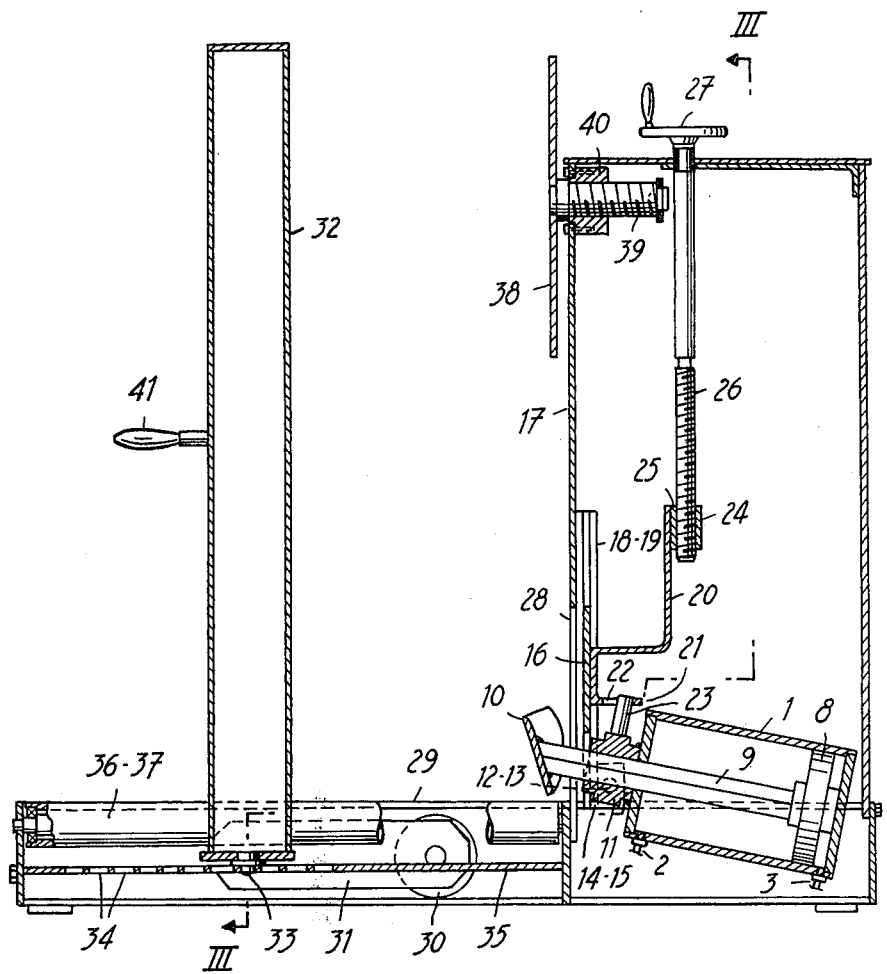

DEVICE USED FOR DETACHING THE BEADS OF A TIRE FROM THE WHEEL RIM

Description

For the detaching of the tire beads by means of pressure, a device is known by means of which the wheel is placed between an upright support which extends over the entire height of the wheel and a pressure plate which can be moved in a straight line movement towards aforesaid support. For this purpose the device is provided with a pressure cylinder of which the protruding end of the piston rod is attached to a pressure plate which exerts pressure upon the bead of the tire when air is admitted to the cylinder.

Such a device does however have the disadvantage that when wheels of different width are placed against the support the pressure plate must travel over a much larger distance to reach the bead of a narrow tire than to reach the bead of a wide tire. The pressure cylinder must consequently be of sufficient lenght, which increases the weight of the device, makes it more costly and slower, because of the relatively large distance the pressure plate has to travel before reaching the bead of the tire.

In order to correct these inconveniences, and according to the main characteristic of the invention, a device has been built of which the backing support can be moved and blocked in the direction of the pressure plate, in such a manner that the bead of the tire which has to be detached is always located against the pressure plate, whichever the width of the wheel, whereas, in order to avoid the toppling over of the wheel due to the action of the pressure plate, a mobile shield is provided above the pressure plate which can be moved towards aforesaid backing support and be blocked against the upper part of the wheel, whereas the pressure cylinder is suspended, so as to be able to pivot in a vertical plane from a slide which can be adjusted in height, all this in such a manner that the pressure plate is always located near the peripheral edge of the wheel rim, whichever the diameter thereof, and that the pressure plate can follow the shape of the wheel rim without damaging it.

Merely as an example and without the slightest intent of limitation a detailed description will be given hereinafter of a selected form of embodiment of the device according to the invention with reference to the appended drawings in which:

FIG. 2 is a longitudinal section of the device;

Figure 1:
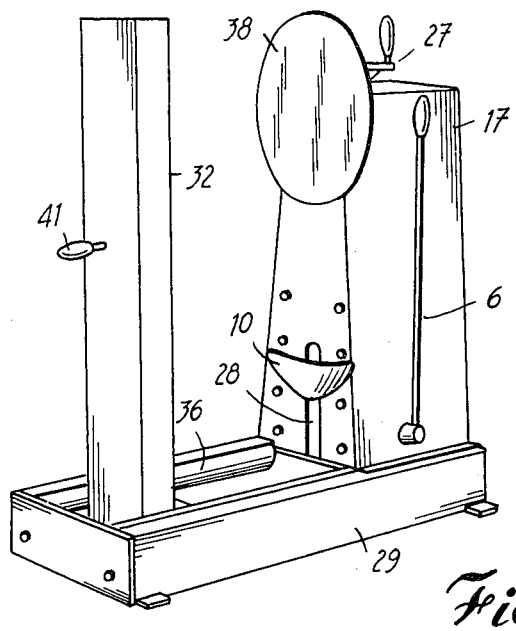
FIG. 1 is a perspective view of the device.
Figure 3:
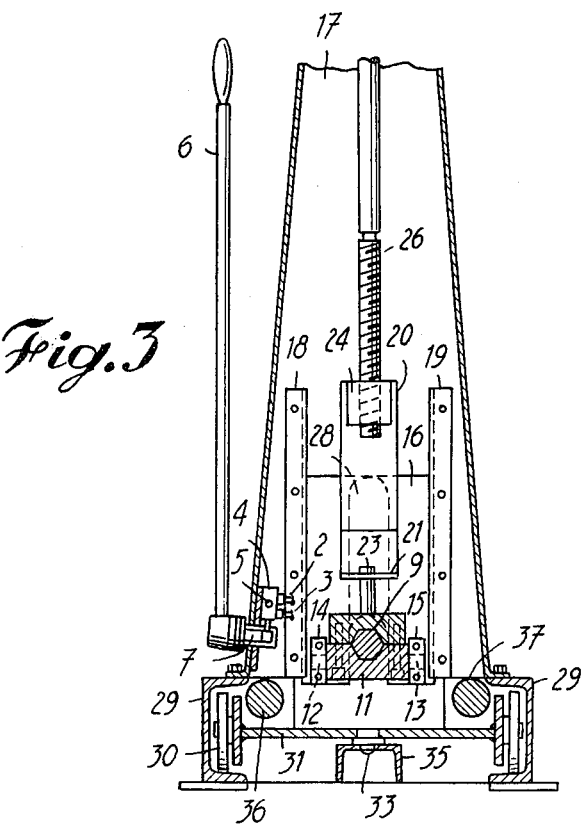
FIG. 3 is a transverse section according to line III—III in FIG. 2.

This device is provided with a double acting pressure cylinder 1, of which the nozzles 2-3 are connected to a valve 4, controlled by a handle 6 pivoting around a shaft 7, and which is connected by a line 5 to an air compressor (not shown). Cylinder 1 contains a piston 8 and a piston rod 9, the end of which, protruding from the cylinder, is provided with a pressure plate 10, used for detaching the tire beads from the wheel rim. A support block 11 is sturdily attached to the front of cylinder 1. The lower end of this support block 11 is provided with two shafts 12-13 each fitted respectively in a bearing 14 and 15. These bearings are fixed to a slide 16, the height of which can be adjusted. A post 23 is fitted to the upper part of support block 11. Cylinder 1 and pressure plate 10 can consequently oscillate around shafts 12 and 13 within the limits of the clearance of post 23 in opening 22 of a stop plate 21, which in integral with slide 16. This slide 16 is guided between two guides 18 and 19 which are fixed to the frame 17 of the device. Slide 16 is suspended, by means of a support 20 and block 24 provided with a threaded opening 25, from a screw rod 26 which is fitted at its upper end with a hand wheel 27. This screw rod 26 is carried by frame 17 and consequently allows the adjustment of the height of slide 16. At the front end, the frame 17 is provided with a slot 28 extending upward, and permitting the passage of piston rod 9 which carries pressure plate 10. At its bottom end the device is also provided with two parallel and horizontal rails 29 with C-shaped cross-section, in which run two guiding rollers 30 which support one end of carriage 31, upon which a backing column 32 is fitted at the other end and against which the wheel is placed. This column 32 is provided with a handle 41 by means of which one end of carriage 31 can be slightly lifted in order to permit the fitting or the removal of a blocking key 33 for carriage 31 into or out of one of notches 34. These notches 34 are provided in a fixed channel section 35 extending lenghtwise and parallel to rails 29. It is due to these notches 34 that backing column 32 can be blocked in the desired position required by the width of the wheel. Two rollers 36 and 37 are provided so as to be able to rotate the wheel freely between column 32 and pressure plate 10. In order to support the upper part of the wheel on the opposite side of column 32, use is made of a stabilizer shield 38 which is int-egral with a horizontal screw rod 39 which cooperates with a threaded bushing 40, which is an integral part of the frame 17. Shield 38 can thus be moved horizontally against the upper part of the wheel, above the pressure plate 10.

In order to detach the bead of a tire by pressure, a wheel of any size is made to rotate on rollers 36-37, between backing column 32 and pressure plate 10. Column 32 is lifted by means of handle 41 so as to unlock blocking key 33 from notch 34, and the entire column assembly 32 with the carriage 31 is moved towards pressure plate 10 until the wheel can rest against column 32 and that the tire may be almost in contact with pressure plate 10. In this position carriage 31 is let down so that anchoring key 33 may enter another notch 34, thus blocking column 32 in this position. In order also to support the other side of the wheel, which is absolutely necessary to prevent the wheel from toppling over when the bead of the tire is being detached, in the case of a wheel of which the hub stands proud and is located against column 32, the shield 38 is brought closer to the upper part of the wheel until it is in contact with the latter by rotating it on its screw shaft 39 in threaded bushing 40. Next, hand wheel 27 is rotated in such a manner that screw rod 26 alters the height of slide 16, which carries cylinder assembly 1 with pressure plate 10, until the latter locates exactly below the edge of the wheel rim. One then operates handle 6 which admits air to cylinder 1, thus causing the movement of pressure plate 10 towards the tire, in such a manner as to detacht the tire bead. By subsequently operating lever 6 in the opposite sense, air is admitted to the otherside of piston 8 in cylinder 1, and the air contained on the other side of the piston is pressed out of the cylinder, whilst pressure plate 10 retracts. During the movement of pressure plate 10, the latter follows the shape of the wheel rim, whereas the entire cylinder assembly 1 pivots around shafts 12-13 in such a manner that the wheel rim can not be damaged.

By rotating the wheel on rollers 36–37, the bead can be detached at any specific location around the circumference of the wheel without further adjustment. In order to detach the bead from the opposite side of the rim, the wheel is merely turned around in the device, after which the operation proceeds as before.

It is perfectly obvious, that the shape, the dimensions and the relative location of the above described elements may vary, providing they remain within the scope of the invention, and that specific parts may be replaced by others which fulfill the same purpose.

I claim:

1. Device for detaching the beads of a tire from a wheel rim, comprising a base, on one end of this base an upright fixed frame, on the other end of this base an upright mobile backing support against which one side of the wheel bears and slideable towards said fixed frame, means for blocking said support on said base, a pressure cylinder pivotally suspended in a vertical plane in a slide adjustable in height and mounted in the fixed frame, means to limit the tumble movement of said pressure cylinder, a pressure plate fixed to the free end of the pistonrod of said pressure cylinder and capable of moving towards said support in order to detach the adjacent bead of the tire, means to displace in height said slide with the pressure cylinder in order always to locate the pressure plate as close as possible against the peripheral edge of the wheel rim whatever the diameter of the wheel, whereby the pressure plate may follow the shape of the wheel rim, a stabilizer shield facing said fixed frame and destined to support the upper part of the other side of the wheel, and means to move said shield towards said backing support 2. Device as claimed in claim 1, in which the upright backing support is fixed to a carriage which can be moved between two rails.

3. Device as claimed in claim 2, in which the mobile carriage carries the backing support, is provided with guide wheels guided in rails wich boast a C-shaped cross-section, and with a blocking key which cooperates with notches in a fixed elonggated part in order to block the carriage and the backing support in a chosen position.

4. Device as claimed in claim 1, in which the stabizer shield is fixed to a screw rod and can be moved horizontally in a threaded bushing fixed to the frame of the device.

5. Device as claimed in claim 1, in which the pessure cylinder is attached to a support block pivotingly fixed by means of two shaft in bearings fitted on the slide of which the height is adjustable.

6. Device as claimed in claim 5, in which the oscillating support block is provided with a post guided in an opening of a stop element which is an integral part of the adjustable height slide, the two extremities of this opening limit the amplitude of the oscillations of said support block of cylinder and consequently also of the pressure plate 7. Device as claimed in claim 1, in which the slide adjustable in height is integral with a threaded block which engages a screw rod fitted in the frame of the device and provided with a hand wheel.

* * * * *